Oct. 11, 1966          G. L. COX          3,277,716
HOT METAL LADLE CONTINUOUS TEMPERATURE MEASURING DEVICE
Filed Nov. 6, 1963                        2 Sheets-Sheet 2

INVENTOR.
GORDON L. COX
BY Oscar B Brumback
his Attorney

United States Patent Office 3,277,716
Patented Oct. 11, 1966

3,277,716
HOT METAL LADLE CONTINUOUS TEMPERATURE MEASURING DEVICE
Gordon L. Cox, Pittsburgh, Pa., assignor to Koppers Company, Inc., a corporation of Delaware
Filed Nov. 6, 1963, Ser. No. 321,933
2 Claims. (Cl. 73—359)

This invention relates generally to the measuring of the temperature of a bath of hot metal and more particularly to apparatus for continuously measuring the temperature of the hot metal during oxygen steelmaking operations.

It is important to know the temperature of the molten metal within the converter during an oxygen steelmaking operation so that the temperature can be adjusted to the desired level before tapping. This has heretofore been done on a "trial and error" basis. The conventional practice has been to blow the charge with oxygen for a specific time; then the oxygen is shut off and the lance removed from the converter; and the converter thereafter tilted to such position that a thermocouple can be inserted into the converter to measure the temperature of the melt. If the temperature is too low, the vessel is repositioned and additional oxygen or other heat is applied. If the temperature is too high, certain cooling agents are added to reduce the temperature to the desired level before tapping. This procedure may take from ten to forty percent of the total refining time, or as much as five to twenty percent of the total heat cycle time. This is a substantial "bottle neck" in the rapid oxygen steelmaking process.

This invention contemplates continuously measuring the temperature of molten ferrous metal in a ladle during the course of a steelmaking operation by a temperature sensor on a temperature probe. The invention contemplates a heavy-walled steel tube or rod which is encased in a refractory sheath with lead wires for connecting the sensor to a remote temperature indicating device. The probe is movable in and out from the molten metal bath.

The above and further objects and novel features of the invention will appear more fully from the following detailed description when the same is read in connection with the accompanying drawings. It is to be expressly understood, however, that the drawings are not intended as a definition of the invention, but are for the purpose of illustration only.

In the drawings wherein like parts are marked alike:

Figure 1:
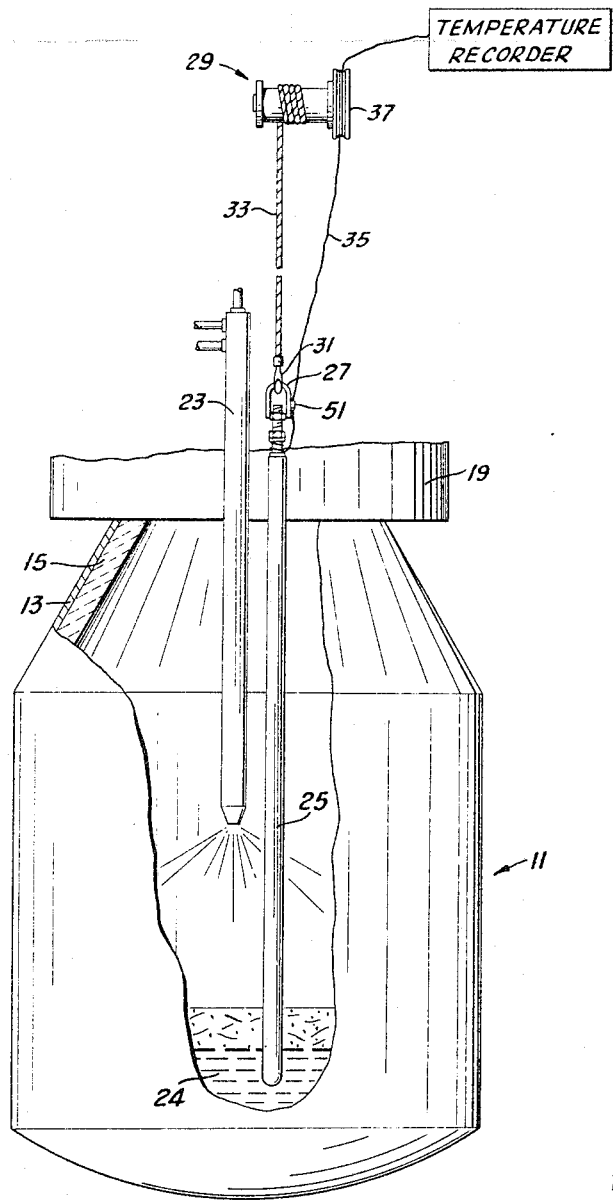
FIGURE 1 is an elevational view with portions broken away of an oxygen steelmaking facility showing in position an embodiment of the temperature measuring device and means for positioning it within the furnace.

A conventional facility for oxygen steelmaking is illustrated somewhat schematically at FIGURE 1. Converter 11 is a conventional closed-bottom oxygen steelmaking vessel. The outer shell 13 is lined with a basic refractory lining 15, conventionally of magnesia ramming mix and tar-bonded magnesia bricks. A hood 19 removes smoke and fumes from the converter. Hood 19 is provided with an opening for oxygen lance 23.

The foregoing is conventional, and it has been difficult and time consuming to determine the temperature of the molten metal bath 24. In accordance with this invention, a temperature probe is inserted into the bath simply and readily through an opening in hood 19 to measure the temperature of the metal bath.

In the embodiment illustrated, a U-shaped bail 27 is attached to the upper end of probe 25 through hook 31 and cable 33 for handling by hoist 29. Electrical cable 35 for connecting the temperature sensor lead wires with a remote temperature indicating device plugs into a suitable receptacle attached to bail 27 near the top of probe 25 and is operated by means of spring cable reel 37.

Figure 2:
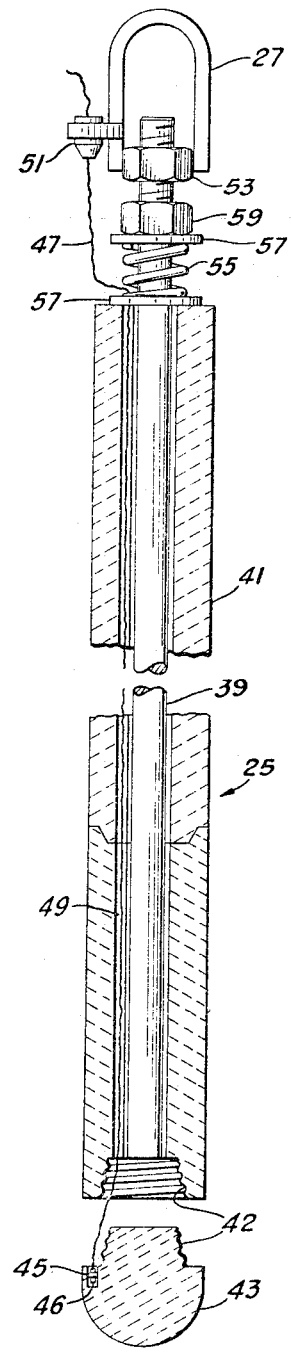
FIGURE 2 is a vertical cross-section of one embodiment of the temperature measuring device.

Referring now to FIGURE 2 for greater details, probe 25 comprises a carbon steel rod 39 encased in a refractory sheath 41 constructed of, for example, first-quality fire brick. Probe 25 has a removable refractory head 43. Advantageously head 43 and sheath 41 are cooperatively threaded at 42.

A receptacle 45 in head 43 provides space for a standard expendable thermocouple 46, such as that of the platinum/platinum rhodium type. The thermocouple leads are routed to the top of probe 25 either through a groove 49 in the refractory sheath as shown, or through a drilled hole or notch in the steel rod. Thermocouple leads 47 connect with electric cable receptacle 51 attached to U-shaped bail 27.

Bail 27 is connected to the upper end of rod 39 by means of a nut 53. A spring 55 is provided to allow expansion of the refractory sheath 41 and is held in place by washers 57 and nut 59.

Referring now to FIGURE 1, the novel probe 25 in operation is lowered into the converter 11 by means of hoist 29, hoist cable 33 and hook 31. Electrical cable 35 is attached to electric cable receptacle 51 with electric cable 35 operated by cable reel 37 and attached at its other end to a conventional remote temperature indicating device.

After a long period of service, the probe can be easily disengaged from the hoist and a spare probe used while necessary maintenance is being performed.

Figure 3:
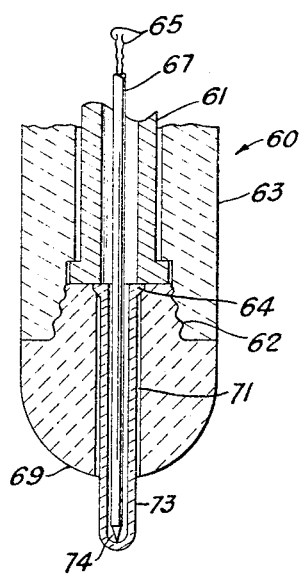
FIGURE 3 is a vertical cross-section of the lower portion of a second embodiment of the device.

A further embodiment of the novel probe is illustrated in FIGURE 3. Probe 60 comprises a heavy-walled steel tube 61 encased in a refractory sheath 63. Thermocouple leads 65 pass through the center of steel tube 61 and are encased in two-wire ceramic insulators 67. A head 69 is detachably mounted to refractory sheath 63 at the end of probe 60 by means of threads 62 and contains a cylindrical opening 71 through its center to receive a tubular fused silica shield 73 which extends below the end of head 69. Silica shield 73 is flanged at its upper end 64 to hold it in place and closed at the lower end. Thermocouple leads 69 extend to the lower end of fused silica shield 73 to a platinum/platinum rhodium thermocouple 74.

The operation of the probe of FIGURE 3 is similar to that described for FIGURE 2. The novel temperature measuring probe of FIGURE 3 providing the additional advantage of quick response of the thermocouple to changes in bath temperature, since the silica shield provides for rapid heat transfer to the thermocouple. This is very desirable, since the refining time in the oxygen steelmaking process is of such short duration. The head and fused silica shield can be quickly and easily replaced as a unit when necessary.

The foregoing has described several embodiments of a probe of relatively simply and inexpensive construction which is suitable for rapidly, continuously and accurately determining the temperature of a molten metal bath during the oxygen steelmaking process and is strong enough to withstand the turbulence and heat of the molten metal bath during the blowing operation.

I claim:
1. In an apparatus for continuously measuring the temperature of molten ferrous metal in a ladle during the course of a steelmaking operation by way of a temperature sensor mounted at one end of a temperature probe that is movable in and out of the molten metal, the improvement of a temperature probe which will withstand long periods of immersion in said metal without requiring auxiliary cooling comprising a steel rod, means for forming a hoist cable connection attached to the top of said rod, a refractory sheath of fire brick for encasing said rod below its upper portion, a spring at the top of said sheath and coaxial with said rod between said hoist cable connection means and said sheath to permit expansion of said sheath, a detachable refractory head at the bottom of said rod, said head and said sheath being cooperatively threaded, a receptacle in said head providing space for a platinum/platinum rhodium thermocouple, and lead wires extending from said thermocouple through a groove in said sheath to a remote temperature indicating device.

2. In an apparatus for continuously measuring the temperature of molten ferrous metal in a ladle during the course of a steelmaking operation by way of a temperature sensor mounted at one end of a temperature probe that is movable in and out of the molten metal, the improvement of a temperature probe which will withstand long periods of immersion in said metal without requiring auxiliary cooling, said probe comprising a heavy-walled metal tube threaded at the top, means suitable for forming a hoist cable connection adapted to be threaded onto said top of said rod, a refractory sheath of fire brick for encasing said tube below its upper threaded portion, a spring at the top of said sheath and coaxial with said tube between said hoist cable connection means and said sheath to permit expansion of said sheath, a detachable refractory head at the bottom of said tube, said head and said sheath being cooperatively threaded, a fused silica tube coaxial with said metal tube extending through said head and extending below it, said silica tube being flanged at its upper portion to hold it in place and closed at its lower end, a platinum/platinum rhodium thermocouple located within said silica tube at its lower end, lead wires extending from said thermocouple within said metal tube to an electrical cable receptacle mounted on said bail, and an electrical cable connecting said receptacle to a remote temperature indicating device.

References Cited by the Examiner

UNITED STATES PATENTS

| | | | |
|---|---|---|---|
| 1,259,372 | 3/1918 | Davey | 73—359 X |
| 2,785,216 | 3/1957 | Winner | 73—359 X |
| 3,080,755 | 3/1963 | Percy | 73—339 X |
| 3,091,119 | 5/1963 | Fischer et al. | 73—343 |

LOUIS R. PRINCE, *Primary Examiner.*

D. McGIEHAN, *Assistant Examiner.*